(12) United States Patent
Kuo et al.

(10) Patent No.: US 7,207,810 B2
(45) Date of Patent: *Apr. 24, 2007

(54) CARD CONNECTOR ASSEMBLY

(75) Inventors: Ming Lun Kuo, Tu-cheng (TW); Chien Jen Ting, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/213,510

(22) Filed: Aug. 26, 2005

(65) Prior Publication Data

US 2006/0128189 A1 Jun. 15, 2006

(30) Foreign Application Priority Data

Dec. 14, 2004 (CN) .................. 2004 2 0054462

(51) Int. Cl.
*H01R 12/00* (2006.01)
(52) U.S. Cl. ...................... 439/79; 439/541.5
(58) Field of Classification Search ............ 439/62–65, 439/74, 79, 541.5, 630
See application file for complete search history.

(56) References Cited

U.S. PATENT DOCUMENTS

| 5,954,522 | A | | 9/1999 | Ho et al. | |
|---|---|---|---|---|---|
| 5,967,803 | A | * | 10/1999 | Ho | ............... 439/79 |
| 6,287,129 | B1 | * | 9/2001 | Kuo | ............ 439/79 |

* cited by examiner

*Primary Examiner*—Khiem Nguyen
(74) *Attorney, Agent, or Firm*—Wei Te Chung

(57) ABSTRACT

A card connector assembly (1) includes an insulating housing (21, 22), a number of contacts (211, 222), a daughter board (7), a rear socket (8) and a spacer (6). The insulating housing (21, 22) defines a card receiving space. Each contact (211, 222) comprises a contacting portion and a soldering portion. The daughter board (7) comprises a plurality of conductive portions. The rear socket (8) is adapted to be mounted to a mother board and to electrically connect with the daughter board (7) to establish an electrical connection between the contacts (211, 222) and the mother board. The spacer (6) is formed with a holding portion (65) on lateral side faces thereof with one end assembled to the insulating housing (21, 22) and the other end mating with the daughter board (7) to securely hold the soldering portions of the contacts.

10 Claims, 6 Drawing Sheets

CARD CONNECTOR ASSEMBLY

BACKGROUND OF THE INVENTION

1. Field of the Invention

The present invention is generally related to a card connector assembly, and particularly to a card connector assembly mounted on a mother board through a daughter board.

2. Description of Related Art

U.S. Pat. No. 5,954,522 discloses a conventional card connector assembly, the card connector assembly comprises an insulating housing, a plurality of contacts received in the insulating housing, a daughter board and a rear socket soldered on a mother board. One end of each contact extends into the card connector assembly and opposite end extends beyond the insulating housing to electrically connect with the daughter board. Furthermore, the daughter board also electrically connects with the rear socket to form electrical connection with the mother board. Thus, the card connector assembly and the mother board are electrically connected together.

However, because one ends of the contacts extend beyond the insulating housing and there is no positioning means in the conventional card connector assembly whereby the daughter board can not obtain a good positional accuracy when it is mating with the one ends of the contacts to mount to the card connector assembly. What is even worse, the incorrect connection between the card connector assembly and the daughter board may cause the daughter board to be easily improperly inserted into the rear socket. The improper insertion may result in that the card connector assembly can't achieve a correct electrical connection with the mother board.

Hence, an improved card connector assembly is highly desired to overcome the aforementioned disadvantages of the prior art.

SUMMARY OF THE INVENTION

Accordingly, an object of the present invention is to provide a card connector assembly mounted on a mother board through a daughter board.

To achieve the above object, a card connector assembly comprises an insulating housing, a plurality of contacts, a daughter board, a rear socket and a spacer. The insulating housing defines a card receiving space along a card insertion direction. The contacts is retained in the insulating housing, each contact comprises a contacting portion exposed into the card receiving space to electrically connect with a card and a soldering portion extending beyond the insulating housing. The daughter board comprises a plurality of conductive portions to electrically connect with the soldering portions of the contacts; a rear socket is adapted to be mounted to a mother board and to electrically connect with the daughter board to establish an electrical connection between the contacts and the mother board. The spacer is formed with a holding portion on lateral side faces thereof with one end assembled to the insulating housing and the other end mating with the daughter board to securely hold the soldering portions of the contacts before the contacts electrically connects with the conductive portions of the daughter board.

Other objects, advantages and novel features of the present invention will be drawn from the following detailed description of a preferred embodiment of the present invention with attached drawings.

DETAILED DESCRIPTION OF THE INVENTION

Figure 1:
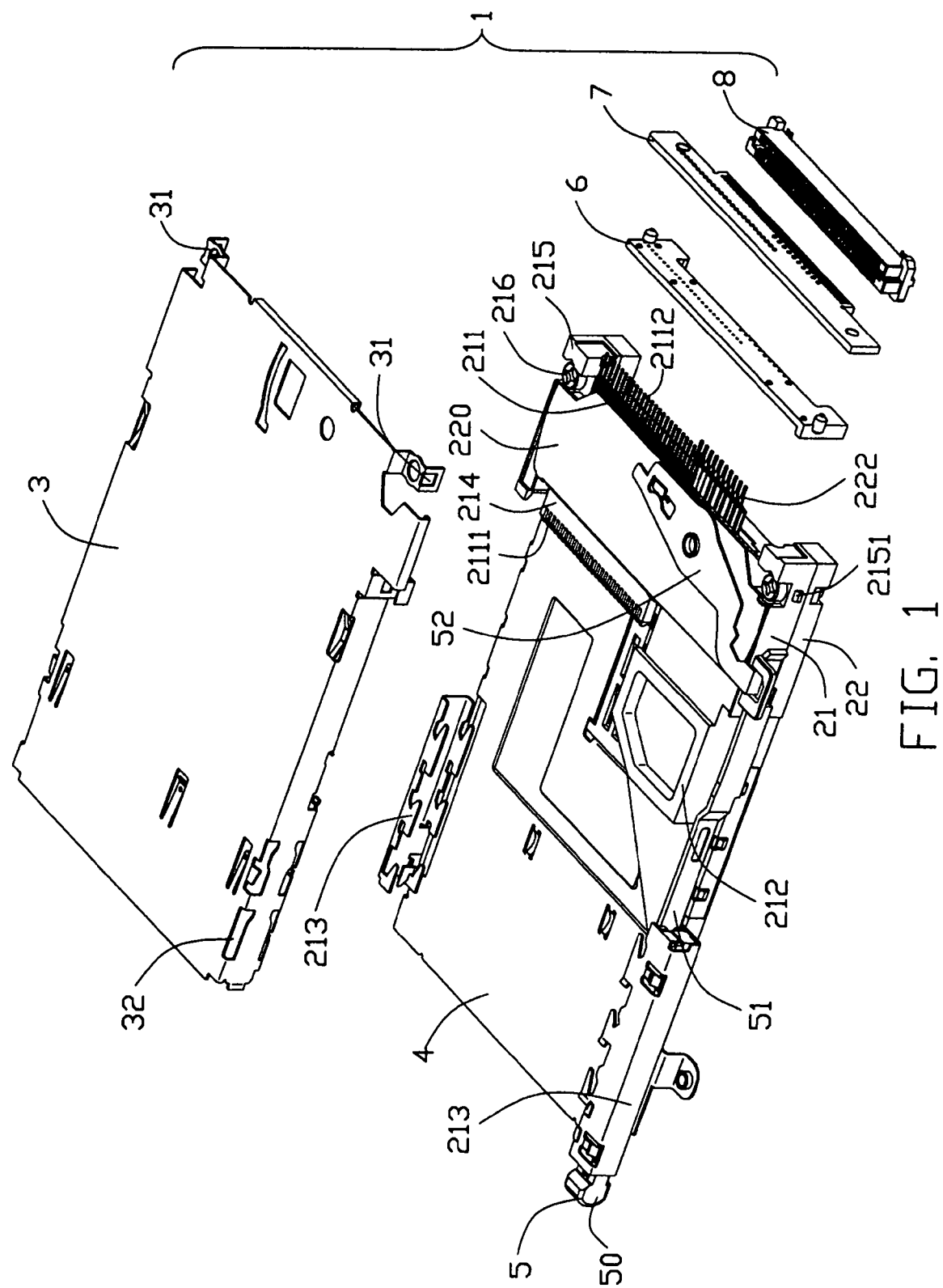
FIG. 1 is a partially exploded, perspective view of a card connector assembly in accordance with the present invention.

Reference will now be made in detail to the preferred embodiment of the present invention.

Referring to FIGS. 1–6, the card connector assembly 1 in accordance with the present invention comprises a first insulating housing 21, a second insulating housing 22, a first set of contacts 211, a second set of contacts 222, an ejector 5, a spacer 6, a daughter board 7 and a rear socket 8. In this embodiment, the first set of contacts 211 are used for electrically connecting with an express card. The second set of contacts 222 are used for electrically connecting with a smart card.

The second insulating housing 22 is a hollow, flat, frame-liked housing. The first insulating housing 21 and the second insulating housing 22 are stacked together. A shield plate 4 is sandwiched between the first insulating housing 21 and the second insulating housing 22 to define a first card receiving space (not labeled) among the shield plate 4, the first insulating housing 21 and a shell 3 covered on the first insulating housing 21, and a second card receiving space (not labeled) between the shield plate 4 and the second insulating housing 22.

Figure 2:
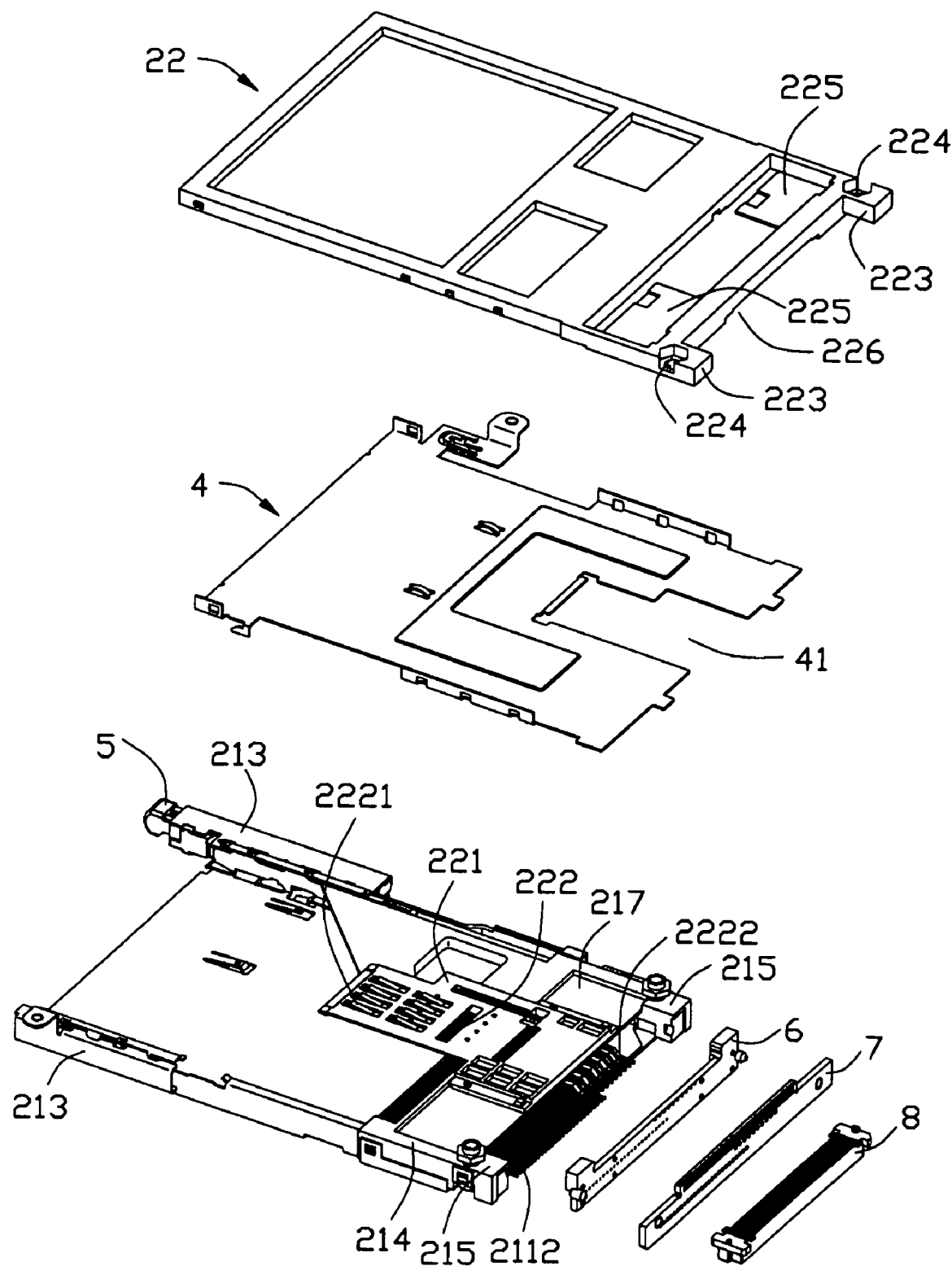
FIG. 2 is a partially exploded, perspective view of the card connector assembly of FIG. 1 and viewed from another aspect.
Figure 3:
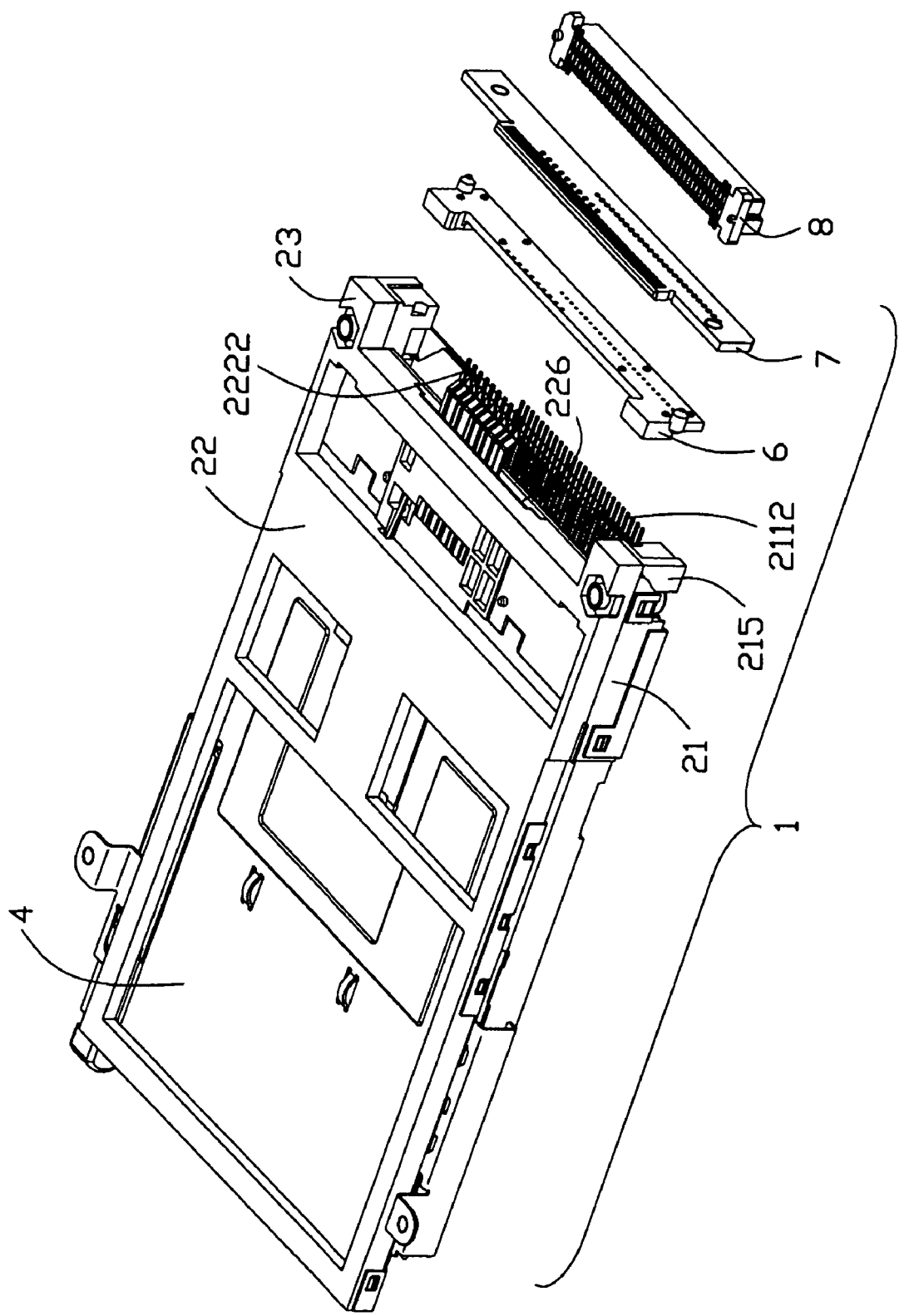
FIG. 3 is a partially assembled, perspective view of the card connector assembly of FIG. 1.

Particularly referring to FIGS. 1 and 2, the first insulating housing 21 comprises an elongated header portion 214 and a trapeziform guiding portion 212 extends forwardly into the first card receiving space from one lateral side of the header portion 214. A pair of first protruding portions 215 extend backwardly from opposite lateral sides of the header portion 214 along a card insertion direction. The first protruding portions 215 define a pair of through holes 216 therein and a pair of wedges 2151 on transverse outsides thereof. A pair of semi-circular recesses 218 (referring to FIG. 4) faced to each other are formed in transverse inner sides of the pair of first protruding portions 215 and a pair of rearward recessed mating portions 219 are formed at longitudinal outsides of the first protruding portions 215. The shell 3 is assembled to the first insulating housing 21 in virtue of mating holes 31 thereof mating with the corresponding wedges 2151. The second insulating housing 22 has a pair of similar constructions as the first protruding portions 215 of the first insulating housing 21, numbered as second protruding portions 223. The second protruding portions 223 also define a pair of holes 224 thereon. The shell 3 and the first and second insulating housing 21, 22 are stacked together by bolts (not labeled) locked in receiving holes (not labeled) of the shell 3, the through holes 216 of the first insulating housing 21 and the holes 224 of the second insulating housing 22.

The first set of contacts 211 are received in the header portion 214 of the first insulating housing 21. Each contact 211 comprises a first contacting portion 2111 exposed into the first card receiving space and a first soldering portion 2112 extending beyond the header portion 214 from the contacting portion 2111. The header portion 214 is formed with a depression 217 recessed upwardly from bottom face thereof.

The shield plate 4 locates between the first insulating housing 21 and the second insulating housing 22 and defines a cutout 41 at rear end thereof. One end of a contact module 221 is approximately received in middle of the depression 217. Opposite end of the contact module 221 extends into the second card receiving space and is fittingly accommodated in the cutout 41 of the shield plate 4. The second set of contacts 222 are received in the contact module 221. Each contact 222 comprises a second contacting portion 2221 exposed into the second card receiving space and a second soldering portion 2222.

The second insulating housing 22 defines a downwardly recessed passage 226 at rear end thereof adjacent to the second protruding portions 223 and comprises a pair of holding plates 225 symmetrically located in front of opposite lateral sides of the recess 226. When the first and second insulating housings 21, 22 assembled, the holding plates 225 are held in the depression 217 of the header portion 214 and locate beside the contact module 221. The second soldering portion 2222 extends through the passage 226 to expose out of the second insulating housing 22 and locate at a lower position compared to the first soldering portion 2112 of the first set of contacts 211.

The card connector assembly 1 further comprises a pair of locking pieces 213 disposed on lateral sides of front part of the shield plate 4 to face to the first card receiving space. The shell 3 defines a pair of locking slots 32 on front part thereof to receive the corresponding locking pieces 213, thus, securely holding the shell 3 on the first insulating housing 21.

The ejector 5 is used for ejecting the express card and assembled to one side of the first insulating housing 21. The ejector 5 comprises a first pushing bar 50, a second pushing bar 51, a first ejecting bar 52 and a second ejecting bar 220. The first pushing bar 50 holds on one of the locking pieces 213. One end of the second pushing bar 51 connects with the first pushing bar 50 and opposite end connects with one end of the first ejecting bar 52. Another end of the ejecting bar 52 pivotally connects with the second ejecting bar 220. The second ejecting bar 220 moveably disposes on the first insulating housing 21 to eject the express card directly.

Figure 4:
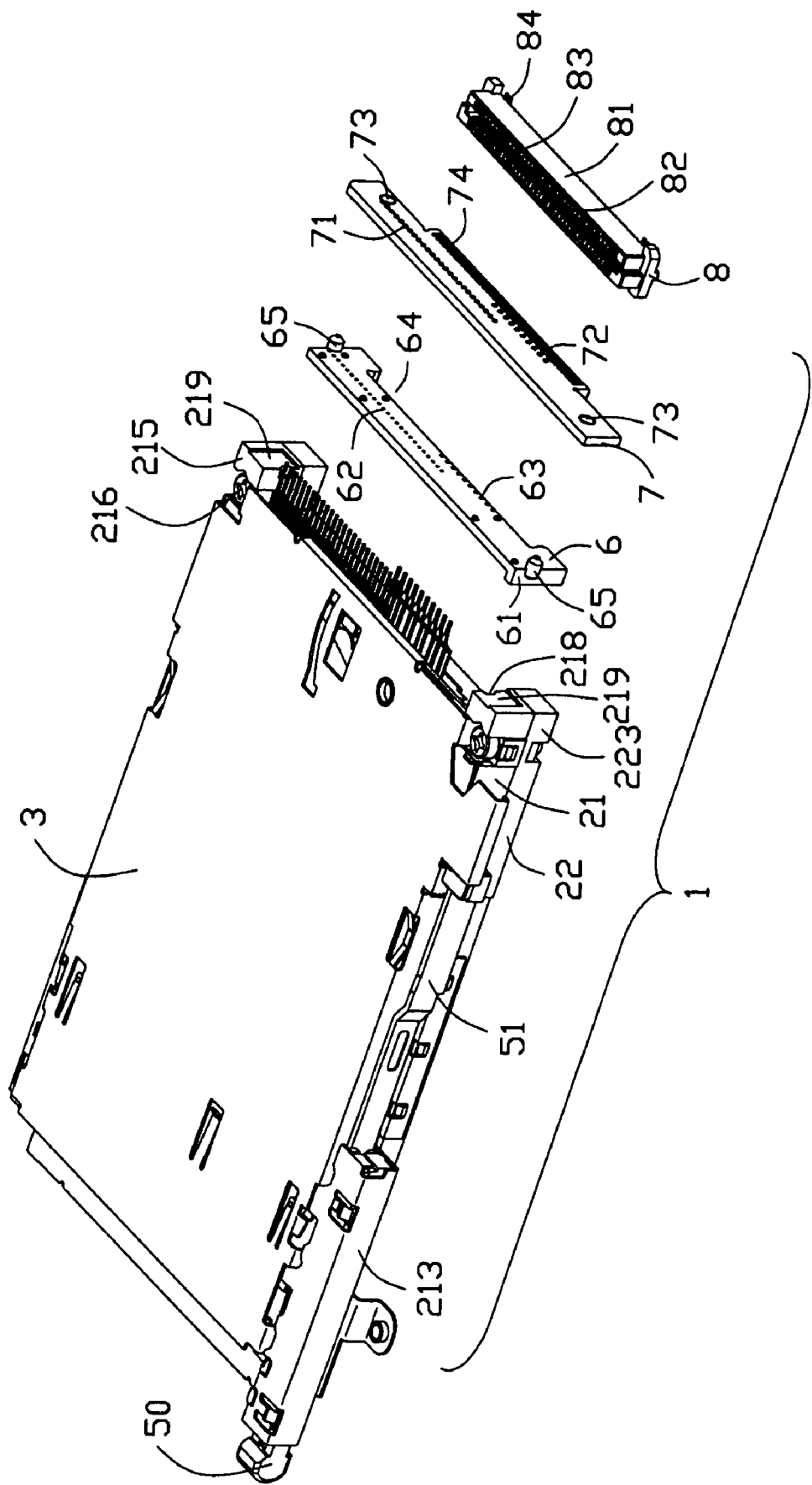
FIG. 4 is a perspective view similar to FIG. 3, but taken from another aspect.
Figure 5:
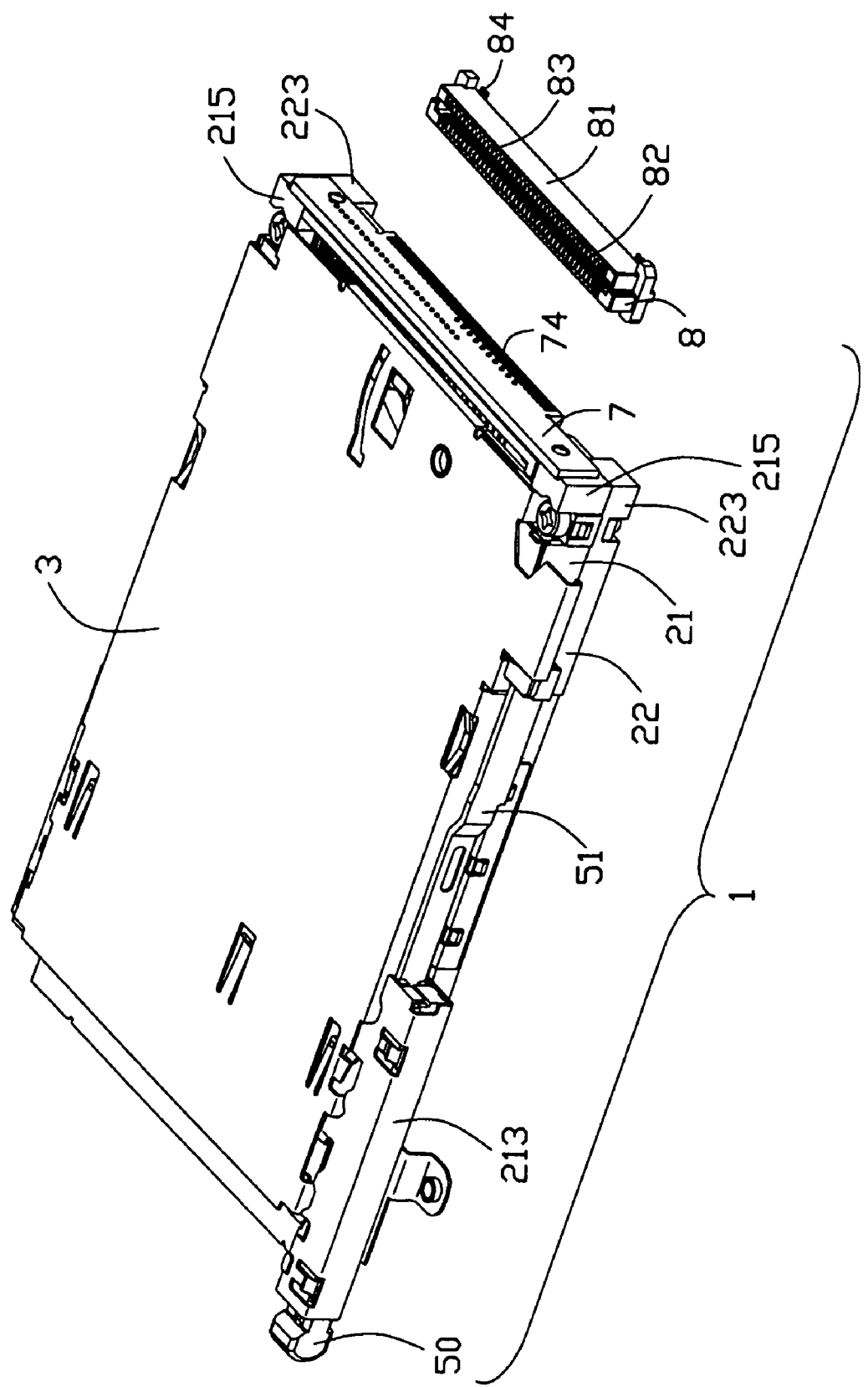
FIG. 5 is an assembled, perspective view of FIG. 4 with a rear socket not assembled.
Figure 6:
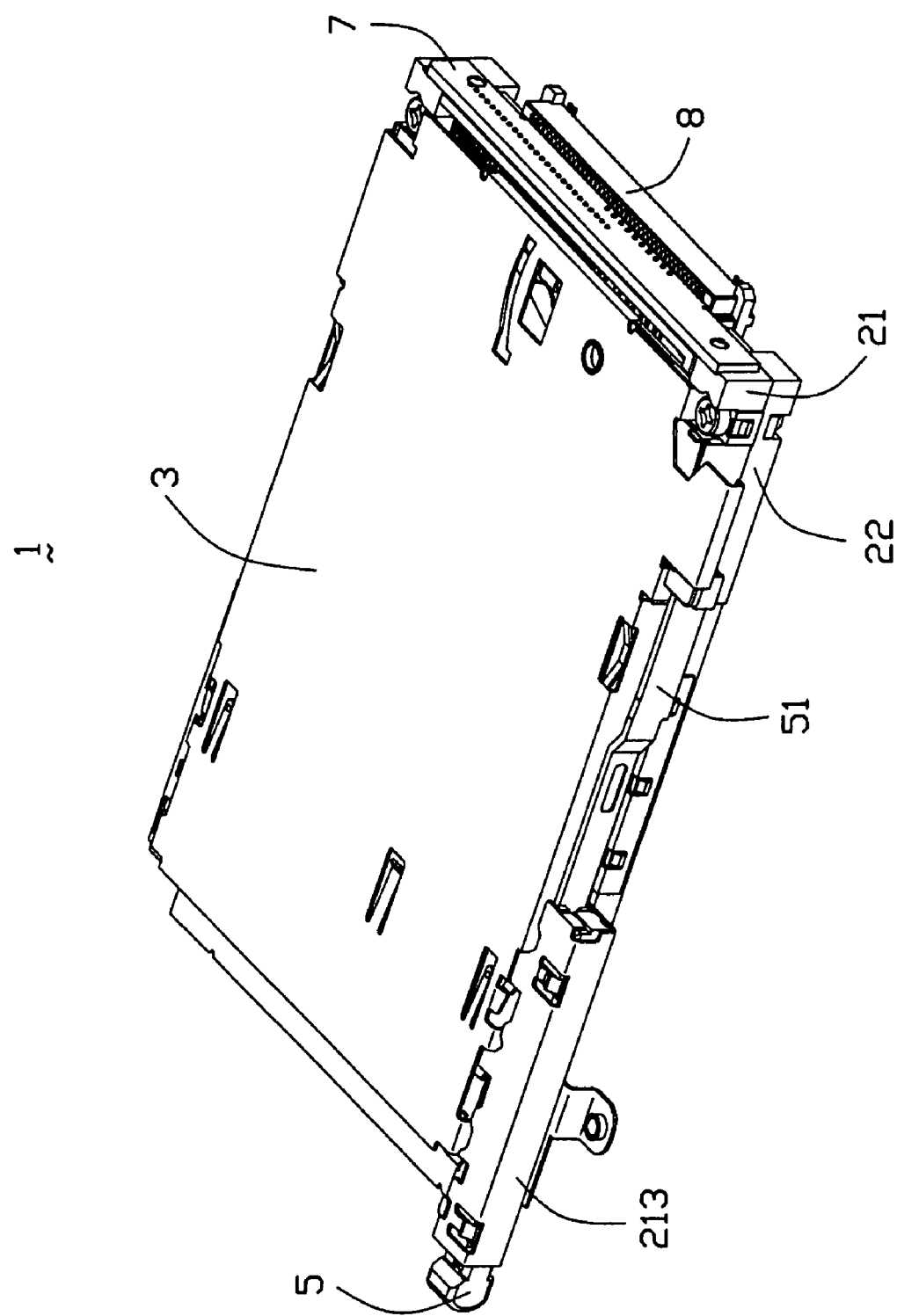
FIG. 6 is an assembled, perspective view of FIG. 1.

Referring to FIGS. 4–6, the spacer 6 comprises a vertically rectangular plate (not labeled) which defines first holding holes 62 and second holding holes 63 arranged in two rows corresponding to the first set of contacts 211 and the second set of contacts 222, respectively. A pair of arms 61 extend forwardly from opposite lateral sides of the rectangular plate along a direction adverse to the card insertion direction and a pair of column holding portions 65 project rearward from an upper portion of opposite side faces of the rectangular plate. A rectangular cut 64 is defined on bottom edge of the rectangular plate.

The daughter board 7 defines a plurality of first conductive holes 71 and a plurality of second conductive holes 72 corresponding to the first holding holes 62 and the second holding holes 63, respectively. A pair of circular holes 73 are defined in an upper portion of lateral sides of the daughter board 7 to receive the corresponding column holding portions 65. A plurality of golden fingers 74 are arranged on a bottom edge of the daughter board 8 and electrically connects with the conductive holes 71, 72, respectively.

The rear socket 8 is a board-to-board type connector and is soldered to a mother board (not shown). The rear socket 8 comprises a cuboidal housing 81 defining a central receiving passage 82. A plurality of terminals 83 are fixed to the housing 81 with contacting portions (not labeled) extending into the passage 82 and tail portions 84 surface mounted to the mother board.

In assembly, the spacer 6 is firstly assembled to the first and second insulating housings 21, 22 to a position in which the column holding portions 65 accommodate in the semicircular recesses 218 of the first insulating housing 21. The rear ends of the first and second set of contacts 211, 222 pass through the first holding holes 62 and the second holding holes 63, respectively with the rear ends thereof exposed beyond the spacer 6. Thereafter, the daughter board 7 is assembled to the first and second insulating housing 21, 22 and the spacer 6 to a position in which the rear ends of the contacts 211, 222 are received in the first and second conductive holes 71, 72, respectively, and the column holding portions 65 accommodate in the circular holes 73 and opposite lateral sides of the daughter board 7 are received in the recessed mating portions 219 (referring to FIG. 4) of the first insulating housing 21. Finally, the daughter board 7 is inserted into the passage of the rear socket 8 to establish an electrical connection between the golden fingers 74 and the terminals 83.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector assembly, comprising:
an insulating housing defining a card receiving space along a card insertion direction;
a plurality of contacts retained in the insulating housing, each contacts comprising a contacting portion exposed into the card receiving space to electrically connect with a card and a soldering portion extending beyond the insulating housing;
a daughter board comprising a plurality of conductive portions to electrically connect with the soldering portions of the contacts;
a rear socket adapted to be mounted to a mother board and to electrically connect with the daughter board to establish an electrical connection between the contacts and the mother board;
a spacer formed with a holding portion on lateral side faces thereof with one end assembly to the insulating housing and the other end mating with the daughter board to securely hold the soldering portions of the contacts before the contacts electrically connect with the conductive portions of the daughter board;
wherein the insulating housing comprises a first insulating housing and a second insulating housing stacked together, and wherein a shield plate locates between the first and second insulating housings;
a shell covering the first insulating housing, the shell, the shield plate and the first insulating housing together defining a first card receiving space, and wherein the shield plate and the second insulating housing define a second card receiving space;
a locking piece assembly to lateral sides of rear end of the shield plate and locked with the shell.

2. The card connector assembly as described in claim 1, wherein the holding portion is approximately a column configuration.

3. The card connector assembly as described in claim 2, wherein the spacer comprises a rectangular plate and the holding portion is formed on lateral side of faces of the rectangular plate and protrudes beyond the rectangular plate along the card insertion direction.

4. The card connector assembly as described in claim 2, wherein the insulating housing is formed with a semi-circular recess to accommodate the holding portion.

5. The card connector assembly as described in claim 1, wherein the insulating housing comprises a recessed mating portion to receive lateral sides of the daughter board.

6. The card connector assembly as described in claim 1, wherein the plurality of contacts comprises a first set of contacts retained in the first insulating housing and the second set of contacts located between the fist and the second insulating housing.

7. The card connector assembly as described in claim 6, further comprising a contact module with the second set of contacts arranged therein, and wherein one end of the contacts module is held in a depression defined in a bottom face of the first insulating housing.

8. The card connector assembly as described in claim 1, further comprising an ejector used for ejecting a card inserted into the first card receiving space.

9. A card connector assembly, comprising:
   an insulating housing defining a card receiving space along a card insertion direction;
   a plurality of contacts retained in the insulating housing, each contacts comprising a contacting portion exposed into the card receiving space to electrically connect with a card and a soldering portion extending beyond the insulating housing;
   a daughter board comprising a plurality of conductive portions to electrically connect with the soldering portions of the contacts;
   a rear socket adapted to be mounted to a mother board and to electrically connect with the daughter board to establish an electrical connection between the contacts and the mother board;
   a spacer holding the soldering portions of the contacts before the contacts electrically connect with the conductive portions of the daughter board;
   wherein the insulating housing comprises a first insulating housing and a second insulating housing stacked together, and wherein a shield plate locates between the first and second insulating housings;
   a shell covering the first insulating housing, the shell, the shield plate and the first insulating housing together defining a first card receiving space, and wherein the shield plate and the second insulating housing define a second card receiving space;
   the contacts including a first group of contacts associated with the first insulative housing, and a second group of contacts associated with the second insulative housing, the soldering portions of the first group of contacts being offset from those of the second group in both vertical and horizontal directions under a condition that the soldering portions of the first group of contacts are located at one side of the daughter board and those of the second group of contacts are located at the other side of the daughter board while the daughter board is connected to the rear socket essentially at a middle section of the daughter board.

10. The card connector assembly as claimed in claim 9, wherein the spacer is formed with holding portions on lateral side faces thereof to be fastened with at least one of the insulative housing and the daughter board.

* * * * *